US012187913B2

(12) United States Patent
Zheng et al.

(10) Patent No.: US 12,187,913 B2
(45) Date of Patent: Jan. 7, 2025

(54) COATING COMPOSITION

(71) Applicant: Covestro Intellectual Property GmbH & Co. KG, Leverkusen (DE)

(72) Inventors: Junchao Zheng, Shanghai (CN); Jianping Shen, Shanghai (CN); Hao Liu, Shanghai (CN); Ling Yang, Shanghai (CN); Jinqi Li, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 860 days.

(21) Appl. No.: 17/286,518

(22) PCT Filed: Nov. 6, 2019

(86) PCT No.: PCT/EP2019/080333
§ 371 (c)(1),
(2) Date: Apr. 19, 2021

(87) PCT Pub. No.: WO2020/094689
PCT Pub. Date: May 14, 2020

(65) Prior Publication Data
US 2021/0355347 A1 Nov. 18, 2021

(30) Foreign Application Priority Data

Nov. 7, 2018 (CN) .......................... 201811322642.8
Dec. 14, 2018 (EP) ...................................... 18212557

(51) Int. Cl.
| | |
|---|---|
| *C09D 175/08* | (2006.01) |
| *C08G 18/18* | (2006.01) |
| *C08G 18/22* | (2006.01) |
| *C08G 18/48* | (2006.01) |
| *C08G 18/73* | (2006.01) |
| *C09D 7/65* | (2018.01) |

(52) U.S. Cl.
CPC ........... *C09D 175/08* (2013.01); *C08G 18/18* (2013.01); *C08G 18/222* (2013.01); *C08G 18/4825* (2013.01); *C08G 18/4837* (2013.01); *C08G 18/73* (2013.01); *C09D 7/65* (2018.01)

(58) Field of Classification Search
CPC ...... C09D 175/08; C09D 7/65; C09D 175/02; C08G 18/18; C08G 18/222; C08G 18/4825; C08G 18/4837; C08G 18/73; C08G 18/725; C08G 18/792; C08G 18/10; C08G 18/3802; C08G 18/485; C08G 18/3821
See application file for complete search history.

(56) References Cited

U.S. PATENT DOCUMENTS

| | | |
|---|---|---|
| 5,126,170 A | 6/1992 | Zwiener et al. |
| 5,236,741 A | 8/1993 | Zwiener et al. |
| 5,243,012 A | 9/1993 | Wicks et al. |
| 5,489,704 A | 2/1996 | Squiller et al. |
| 5,736,604 A | 4/1998 | Luthra |
| 6,355,829 B2 | 3/2002 | Roesler et al. |
| 6,458,293 B1 | 10/2002 | Roesler et al. |
| 6,833,424 B2 | 12/2004 | Milhem |
| 7,169,876 B2 | 1/2007 | Asher |
| 2002/0002300 A1 | 1/2002 | Roesler et al. |
| 2003/0105220 A1* | 6/2003 | Gupta ................... C08G 18/792 524/589 |
| 2004/0067315 A1* | 4/2004 | Niesten ................... C08G 18/10 427/372.2 |
| 2006/0247371 A1 | 11/2006 | Mundstock et al. |
| 2016/0244635 A1* | 8/2016 | Wouldhave .......... C09D 175/02 |

FOREIGN PATENT DOCUMENTS

| | | |
|---|---|---|
| EP | 3098247 A1 | 11/2016 |
| WO | 2012069623 A1 | 5/2012 |

OTHER PUBLICATIONS

Rompp's Chemical Dictionary (Rommp Chemie Lexikon), 10th ed., Georg Thieme Verlag Stuttgart, 1996.
International Search Report, PCT/EP2019/080333, date of mailing: Jan. 30, 2020.

* cited by examiner

*Primary Examiner* — K. Boyle
(74) *Attorney, Agent, or Firm* — Richard P. Bender; Jed C. Benson

(57) ABSTRACT

The present invention relates to a coating composition, a coating method and use of the composition, and a product coated with the coating composition. The coating composition comprises: (a) an isocyanate-reactive component; (b) an isocyanate component comprising: (b1) at least one isocyanate prepolymer, the isocyanate prepolymer being a reaction product of components comprising at least one aliphatic isocyanate and at least one polyether polyol, the polyether polyol having a weight-average molecular weight of 400 to 6000 and the structure of HO—$R^1{}_n$—$R^2$; and (b2) at least one isocyanate oligomer containing not less than two isocyanate groups, the weight ratio of the isocyanate prepolymer (b1) to the isocyanate oligomer (b2) being greater than 1:4 and less than 4:1; and (c) a catalyst; wherein the molar ratio of the isocyanate groups to the isocyanate-reactive groups in the coating composition is from 1.5:1 to 4:1.

18 Claims, No Drawings

COATING COMPOSITION

CROSS-REFERENCE TO RELATED APPLICATION

This application is a national stage application under 35 U.S.C. § 371 of PCT/EP2019/080333, filed Nov. 6, 2019, which claims the benefit of European Application No. 18212557.5, filed Dec. 14, 2018, and Chinese Application No. 201811322642.8, filed Nov. 7, 2018, each of which is incorporated herein by reference.

TECHNICAL FIELD

The present invention relates to a coating composition, a coating method and use of the coating composition, and a product coated using the coating composition.

BACKGROUND

The aspartic ester coatings are widely used because of their advantages of weather resistance, abrasion resistance, heat and humidity resistance, and salt spray resistance, as well as their ability to meet high solids level, low viscosity and environmental protection requirements, especially for waterproofing and corrosion protection. However, the existing aspartic ester coatings generally suffer from a short pot life, and are therefore difficult to be applied in an application manner widely used in the field of a floor, such as roll coating and brush coating. It follows that they can only be applied by using special spraying equipment, which increases the difficulty and cost of application and thus greatly affects the application of aspartic ester coatings in the field of a floor or the like.

The current methods for extending the pot life of aspartic ester coatings are mainly as follows: 1) a large amount of reactive diluents or solvents are added to the coating to reduce the viscosity growth rate of the coating, thereby ensuring a sufficient pot life. However, many reactive diluents (such as vinylene carbonate) and solvents have a certain degree of toxicity, and the addition of a large amount of reactive diluents or solvents may cause extra environmental pollution, which does not comply with the trend and requirements of environmental protection. 2) Isocyanates having low activity, such as isocyanate prepolymers, are used to reduce the reactivity, so as to ensure that the coating has a sufficient pot life. However, the low-activity isocyanate prepolymers generally have a high viscosity, which increases the difficulty of application and makes the drying rate of the resultant coating too slow and its hardness relatively low. Therefore, the low-activity isocyanates are only suitable for some applications in the field of polyurethane elastomers or waterproof coatings, but not for anti-corrosion coatings or floor coatings (see, for example, US 20040067315 A). 3) Low-activity amino components, such as 3,3'-dimethyl-4,4-diaminodicyclohexylmethane, are used to synthesize the aspartic esters. Although this method can extend the pot life, the drying time of the coating is also greatly prolonged.

Therefore, it is desirable to develop a coating composition having a long pot life, which forms a coating having the advantages of fast drying and high hardness.

SUMMARY OF THE INVENTION

It is an object of the present invention to provide a coating composition, a coating method and use of the coating composition, and a product coated with the coating composition.

The coating composition according to the present invention comprises:
(a) an isocyanate-reactive component comprising:
  (a1) at least one polyaspartic ester, and
  (a2) optionally a polyetheraspartic ester;
(b) an isocyanate component comprising:
  (b1) at least one isocyanate prepolymer, the isocyanate prepolymer being a reaction product of components comprising at least one aliphatic isocyanate and at least one polyether polyol, the polyether polyol having a weight-average molecular weight of 400 to 6000 and the structure of formula I:

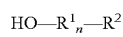    I, wherein $R^1$ has one or more of the following structures:

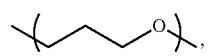    II

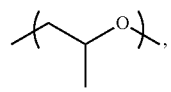    III and

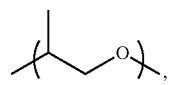    IV $R^2$ is one or more of the following: hydrogen and an organic group inert to an isocyanate group, n is an integer of 6 to 100, the amount of the —$R^1_n$— structure is at least 40 wt % based on the weight of the polyether polyol; and (b2) at least one isocyanate oligomer containing not less than two isocyanate groups, the weight ratio of the isocyanate prepolymer (b1) to the isocyanate oligomer (b2) being greater than 1:4 and less than 4:1;

(c) a catalyst; and (d) optionally an additive;

wherein the molar ratio of the isocyanate groups to the isocyanate-reactive groups in the coating composition is from 1.5:1 to 4:1.

According to one aspect of the invention, there is provided the use of the coating composition provided according to the present invention for protecting a substrate surface or a coating thereof.

According to another aspect of the invention, there is provided a coating method comprising the steps of applying the coating composition provided according to the present invention to a substrate surface, followed by curing and drying.

According to another aspect of the invention, there is provided a coated product comprising a substrate and a coating formed by applying the coating composition provided according to the present invention to the substrate and then curing and drying.

The coating composition of the present invention has a long pot life, and the coating formed by the composition has not only the advantages of fast drying and high hardness, but also a high bubble-free film thickness, thus greatly reducing the risk of coating blistering.

DETAILED DESCRIPTION

The present invention provides a coating composition comprising:
(a) an isocyanate-reactive component comprising:
  (a1) at least one polyaspartic ester, and
  (a2) optionally a polyetheraspartic ester;
(b) an isocyanate component comprising:
  (b1) at least one isocyanate prepolymer, the isocyanate prepolymer being a reaction product of components comprising at least one aliphatic isocyanate and at least one polyether polyol, the polyether polyol having a weight-average molecular weight of 400 to 6000 and the structure of formula I:

$$HO-R^1{}_n-R^2 \qquad\qquad I,$$

wherein $R^1$ has one or more of the following structures:

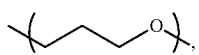
II

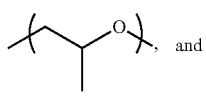
III
, and

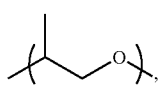
IV $R^2$ is one or more of the following: hydrogen and an organic group inert to an isocyanate group,
n is an integer of 6 to 100,
the amount of the $-R^1{}_n-$ structure is at least 40 wt % based on the weight of the polyether polyol; and
(b2) at least one isocyanate oligomer containing not less than two isocyanate groups,
the weight ratio of the isocyanate prepolymer (b1) to the isocyanate oligomer (b2) being greater than 1:4 and less than 4:1;
(c) a catalyst; and
(d) optionally an additive;
wherein the molar ratio of the isocyanate groups to the isocyanate-reactive groups in the coating composition is from 1.5:1 to 4:1.

The present invention also provides a coating method and use of the coating composition, and a product coated with the coating composition.

Coating Composition

The organic group described herein that does not react with or is inert to an isocyanate group refers to that having no Zerevitinov-active hydrogen. Zerevitinov-active hydrogen is defined in Rompp's Chemical Dictionary (Rommp Chemie Lexikon), 10th ed., Georg Thieme Verlag Stuttgart, 1996. Generally, groups with Zerevitinov-active hydrogen include, but are not limited to hydroxyl, amino, and thiol groups.

The coating composition described herein is a two-component coating composition. The term "two-component" refers to a coating composition comprising at least two components that must be stored in separate containers because of their mutual reactivity. When the two separate components are mixed and applied on a substrate, the mutually reactive compounds in the two components react to crosslink and form a cured coating.

The term "curing and drying" as used herein refers to the progression of a liquid coating composition from the liquid state to a cured state.

The term "each independently" as used herein means to be the same or different.

The molar ratio of the isocyanate groups to the isocyanate-reactive groups in the composition is preferably from 1.5:1 to 3.5:1, more preferably from 1.5:1 to 3:1, and most preferably from 1.5:1 to 2.5:1.

The isocyanate-reactive groups may be hydroxyl, thiol, and amino groups, most preferably secondary amino groups.

The coating composition preferably has an organic solvent content of less than 60 g/L.

Isocyanate-Reactive Component (a)

Polyaspartic Ester (a1)

As used herein, the term "polyamine" refers to compounds comprising at least two free primary and/or secondary amino groups. Polyamines include polymers comprising at least two pendant and/or terminal amino groups.

The polyaspartic ester is obtained by the Michael addition reaction of a system comprising a polyamine and an ester.

The ester is preferably one or more of the following: a maleate and a fumarate.

The reaction for preparing the polyaspartic ester can be carried out without any solvent or in the presence of a suitable solvent.

The solvent is preferably one or more of the following: an alcohol, an ether, an acetate, and a ketone.

The alcohol is preferably one or more of the following: methanol, ethanol, butyl glycol, and propanol.

The acetate is preferably n-butyl acetate.

The ketone is preferably methyl ethyl ketone dialkane.

The polyaspartic ester (a1) preferably comprises a polyaspartic ester according to formula XI:

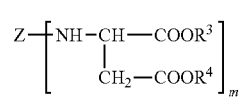
XI wherein
Z represents an aliphatic residue,
$R^3$ and $R^4$ are each independently an organic group that is inert to an isocyanate group at normal pressure and at 100° C. or less,
m is an integer of not less than 2.

The $R^3$ and $R^4$ are each independently preferably an alkyl residue having 1 to 10 carbon atoms, and most preferably one or more of the following: methyl, ethyl, and butyl.

The m is preferably an integer of 2 to 4, most preferably 2.

The aliphatic residue of the polyaspartic ester is preferably one or more of the following: a linear alkyl residue, a branched alkyl residue, and a cycloalkyl residue, most preferably a cycloalkyl residue.

The polyaspartic ester preferably has a content of more than 50 wt %, based on the total weight of the isocyanate-reactive component (a).

The polyaspartic ester most preferably has a content of 65 to 100 wt %, based on the total weight of the isocyanate-reactive component (a).

The polyaspartic ester preferably has an amino group equivalent of 200 to 500.

The polyaspartic ester preferably has a viscosity of 50 to 4000 mPa·s (23° C.).

When m is 2, the polyaspartic ester is prepared by a reaction comprising a polyamine of the following formula and a maleate and/or a fumarate of the following formula:

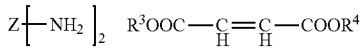

The polyamine is preferably one or more of the following: ethylenediamine, 1,2-diaminopropane, 1,4-diaminobutane, 1,3-diaminopentane, 1,6-diaminohexane, 2,5-diamino-2,5-dimethylhexane, 2,2,4-trimethyl-1,6-diaminohexane, 2,4,4-trimethyl-1,6-diaminohexane, 1,11-diaminoundecane, 1,12-diaminododecane, 1,3-cyclohexanediamine and 1,4-cyclohexanediamine, amino-3,3,5-trimethyl-5-aminomethylcyclohexane, 2,4-hexahydrotoluenediamine, 2,6-hexahydrotoluenediamine, 2,4'-diamino-dicyclohexylmethane, 4,4'-diamino-dicyclohexylmethane, 3,3'-dialkyl-4,4'-diaminodicyclohexylmethane, 2-methyl-1,5-pentanediamine, 1,3-xylenediamine and 1,4-xylenediamine; further preferably one or more of the following: 1,4-aminobutane, 1,6-diaminohexane, 2,2,4-trimethyl-1,6-diaminohexane, 2,4,4-trimethyl-1,6-diaminohexane, amino-3,3,5-trimethyl-5-aminomethylcyclohexane, 4,4'-diamino-dicyclohexylmethane, 3,3'-dialkyl-4,4'-diaminodicyclohexylmethane and 2-methyl-1,5-pentanediamine; more preferably one or more of the following: 2-methyl-1,5-pentanediamine, amino-3,3,5-trimethyl-5-aminomethylcyclohexane, 2,4'-diamino-dicyclohexylmethane and 4,4'-diamino-dicyclohexylmethane; and most preferably one or more of the following: 2,4'-diamino-dicyclohexylmethane and 4,4'-diamino-dicyclohexylmethane.

The maleate and/or fumarate are preferably one or more of the following: dimethyl maleate, diethyl maleate, dibutyl maleate, dimethyl fumarate, diethyl fumarate, and dibutyl fumarate.

The temperature of the reaction is preferably from 0° C. to 100° C.

The molar ratio of the maleate and/or fumarate to the polyamine is preferably 2:1.

The molar ratio of the olefinic double bonds of the maleate and/or fumarate to the primary amino groups of the polyamine is preferably 1:1.

The components of the reaction for preparing a polyaspartic ester may or may not comprise a solvent, and most preferably comprise a solvent.

The solvent is preferably one or more of the following: methanol, ethanol, propanol, and dioxane.

The polyaspartic ester (a1) preferably comprises one or more of the following:

(i) a polyaspartic ester having the structure of formula XII,

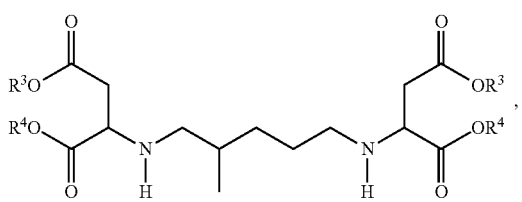

(ii) a polyaspartic ester having the structure of formula XIII, and

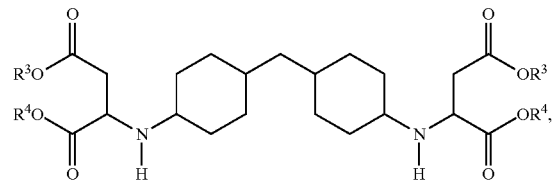

(iii) a polyaspartic ester having the structure of formula XIV,

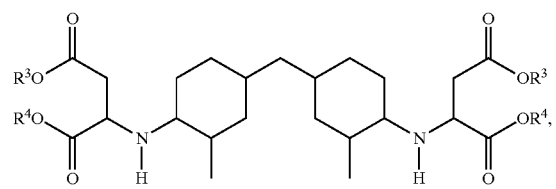

wherein $R^3$ and $R^4$ are each independently one or more of the following: methyl, ethyl and butyl.

The $R^3$ and $R^4$ are each independently most preferably ethyl.

The polyaspartic ester (a1) more preferably comprises a polyaspartic ester having the structure of formula XIII:

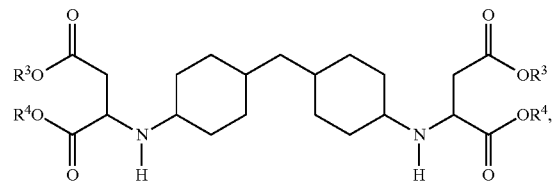

wherein $R^3$ and $R^4$ are each independently one or more of the following: methyl, ethyl and butyl.

The $R^3$ and $R^4$ are each independently most preferably ethyl.

The polyaspartic ester is most preferably one or more of the following: the isocyanate-reactive components as described in U.S. Pat. Nos. 512,617, 523,674, 5,489,704, 5,243,012, 5,736,604, 6,458,293, 6,833,424, 7,169,876 or US2006/0247371, Desmophen NH1220, Desmophen NH1420, Desmophen NH1520, and Desmophen NH1521.

Polyetheraspartic Ester (a2)

The polyetheraspartic ester preferably has a content of less than 35 wt %, based on the total weight of the isocyanate-reactive component.

The polyetheraspartic ester most preferably has a content of less than 25 wt %, based on the total weight of the isocyanate-reactive component.

The polyetheraspartic ester preferably has an amino group equivalent of 200 to 2500, preferably 200 to 500.

The polyetheraspartic ester preferably has a viscosity of 50 to 2000 mPa·s (23° C.).

The polyetheraspartic ester (a2) preferably comprises a polyetheraspartic ester according to formula XV:

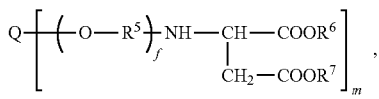

XV wherein
Q represents an aliphatic residue,
$R^6$ and $R^7$ are each independently an organic group that is inert to an isocyanate group at normal pressure and at 100° C. or less,
$R^5$ represents a $C_1$-$C_6$ alkyl residue,
m is an integer of not less than 2,
f is an integer of 1 to 35, more preferably 1 to 8, and most preferably 1 to 5.

The $R^6$ and $R^7$ are each independently preferably an alkyl residue having 1 to 10 carbon atoms, and most preferably one or more of the following: methyl, ethyl, and butyl.

The aliphatic residue is preferably one or more of the following: a linear alkyl residue, a branched alkyl residue, and a cycloalkyl residue.

The polyetheraspartic ester is preferably obtained by the Michael addition reaction of a system comprising a polyetheramine and a dialkyl maleate.

The polyetheraspartic ester is further preferably obtained by a reaction comprising a polyether polyamine of the following formula and a maleate and/or a fumarate of the following formula:

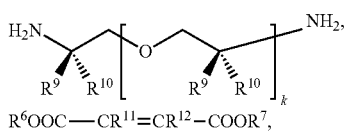

wherein
k is an integer of not less than 2, further preferably 2 to 35, more preferably 2 to 8, and most preferably 2.5 to 6.1,
$R^6$ and $R^7$ are each independently an organic group that is inert to an isocyanate group at normal pressure and at 100° C. or less,
$R^9$ and $R^{10}$ are each independently one or more of the following: hydrogen and a $C_1$-$C_4$ alkyl residue,
$R^{11}$ and $R^{12}$ are each independently one or more of the following: hydrogen and an organic group inert to an isocyanate group.

The $R^6$ and $R^7$ are each independently preferably an alkyl residue having 1 to 10 carbon atoms, and most preferably one or more of the following: methyl, ethyl, and butyl.

The $R^9$ and $R^{10}$ are each independently most preferably one or more of the following: hydrogen and methyl.

The $R^{11}$ and $R^{12}$ are each independently preferably hydrogen.

The number-average molecular weight of the polyether polyamine is preferably from 100 g/mol to 5000 g/mol, more preferably from 100 g/mol to 2000 g/mol, and most preferably from 148 g/mol to 600 g/mol.

The polyether polyamine is preferably an aliphatic polyether polyamine containing primary amino groups, such as Jeffamine polyether polyamine, available from Huntsman Corporation, The Woodlands, TX.

The maleate and/or fumarate preferably comprise one or more of the following groups: dimethyl ester, diethyl ester, dibutyl ester, dipentyl ester, di-2-ethylhexyl ester, substituted by methyl at the 2-position and substituted by methyl at the 3-position.

The dibutyl ester is preferably one or more of the following: di-n-butyl ester, di-sec-butyl ester, and di-tert-butyl ester.

The maleate and/or fumarate are most preferably one or more of the following: dimethyl maleate, diethyl maleate, dibutyl maleate, dimethyl fumarate, diethyl fumarate, and dibutyl fumarate.

The components for preparing the polyetheraspartic ester (a2) preferably further comprise a polyether polyamine according to the following formula:

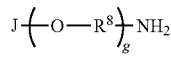

wherein
J is one or more of the following: a linear alkyl residue, a branched alkyl residue, and a cycloalkyl residue,
g is an integer of 1 to 35,
$R^8$ is a $C_1$-$C_6$ alkyl residue.

The polyetheraspartic ester (a2) preferably comprises a polyetheraspartic ester according to formula XVI:

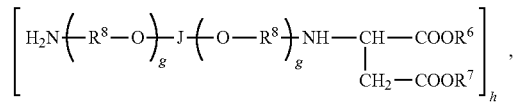

XVI wherein
h is an integer of 2 to 4,
g is an integer of 1 to 35,
s is 1 to 2,
J is an alkyl residue,
$R^6$ and $R^7$ are each independently an organic group that is inert to an isocyanate group at normal pressure and at 100° C. or less,
$R^8$ is a $C_1$-$C_6$ alkyl residue.

The g is preferably an integer of 1 to 8, and most preferably an integer of 1 to 5.

The $R^6$ and $R^7$ are each independently preferably an alkyl residue having 1 to 10 carbon atoms, and most preferably one or more of the following: methyl, ethyl, and butyl.

The J is preferably one or more of the following: a linear alkyl residue, a branched alkyl residue, and a cycloalkyl residue; most preferably one or more of the following: ethyl, propyl, butyl, hexyl, cyclohexyl, dicyclohexylmethyl, 3,3'-dimethyldicyclohexylmethyl, 2-methylpentyl, 1,1,1-tri(methyl)propyl and 2,2-bis(methyl)propyl.

The $R^8$ is preferably one or more of the following: methyl, ethyl, and butyl.

The polyetheraspartic ester is most preferably Desmophen NH2850 XP, available from Covestro (Germany), Leverkusen, Germany.

Isocyanate Component (b)

The isocyanate groups of the composition of the present invention include free and potentially free isocyanate groups.

Isocyanate Prepolymer (b1)

The isocyanate prepolymer has an isocyanate group functionality of preferably 1.9 to 4.5.

The isocyanate prepolymer has an isocyanate group content of preferably 1 to 40 wt %, more preferably 1 to 20 wt %, and most preferably 3 to 10 wt %, based on the total weight of the isocyanate prepolymer.

The isocyanate prepolymer preferably has a viscosity of 1000 to 20000 mPa·s (23° C.), most preferably 1000 to 8500 mPa·s (23° C.).

The isocyanate prepolymer has an isocyanate group equivalent of preferably 400 to 1200.

The excess isocyanate monomers remaining in the reaction for preparing the isocyanate prepolymer can be removed by distillation to obtain a prepolymer without monomers.

Aliphatic Isocyanate

The aliphatic isocyanate preferably has an isocyanate functionality of not more than 2.

The aliphatic isocyanate for synthesizing the isocyanate prepolymer is preferably one or more of the following: pentamethylene diisocyanate, hexamethylene diisocyanate (HDI), 2,2-dimethylpentane diisocyanate, 2,2,4-trimethylhexane diisocyanate, butene diisocyanate, 1,3-butadiene-1,4-diisocyanate, 2,4,4-trimethyl-1,6-hexane diisocyanate, bis(isocyanatoethyl)carbonate, bis(isocyanatoethyl)ether and lysine methyl ester diisocyanate, most preferably hexamethylene diisocyanate.

Polyether Polyol

The polyether polyol has a weight-average molecular weight of preferably 600 to 4000, most preferably 1000 to 4000.

The polyether polyol preferably has a hydroxyl functionality of 2.

The polyether polyol has a hydroxyl number of preferably 25 to 400 mg/g KOH, most preferably 25 to 115 mg/g KOH.

The $R^1$ preferably has one or more of the following structures: the structure of formula III and the structure of formula IV.

The n is preferably an integer of 10 to 70, most preferably an integer of 14 to 52.

The polyether polyol is preferably one or more of the following:

(i) a polyether polyol having the structure of formula V:

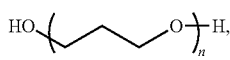

V (ii) a polyether polyol having the structure of formula VI:

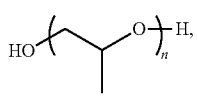

VI (iii) a polyether polyol having the structure of formula VII:

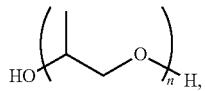

VII (iv) a polyether polyol having the structure of formula VIII:

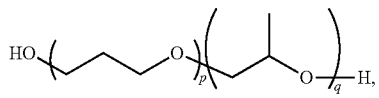

VIII and (v) a polyether polyol having the structure of formula IX:

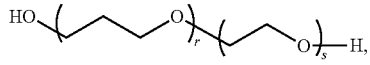

IX (vi) a polyether polyol having the structure of formula X:

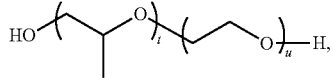

X wherein p, q, r, s, t and u are each independently an integer of not less than 1, the sum of p and q is n, the sum of r and s is n, and the sum of t and u is n.

The amount of the $-R^1{}_n-$ structure is preferably at least 50 wt %, more preferably at least 70 wt %, and most preferably from 90 wt % to 100 wt %, based on the weight of the polyether polyol.

The polyether polyol is most preferably polyoxypropylene diol or a mixture of polyoxypropylene diol and polyoxyethylene diol.

The polyether polyol may be a mixture of two or more polyether polyols having the structure of formula I.

Preferably, the components for preparing the isocyanate prepolymer further comprises at least one polyol different from said polyether polyol, and in this case the amount of the $-R^1{}_n-$ structure is at least 50 wt % based on the total weight of said polyether polyol and the polyol different from said polyether polyol.

The polyol different from said polyether polyol is preferably one or more of the following: a polyether polyol, a polyester polyol and a polycarbonate polyol, most preferably a polyether polyol and/or a polyester polyol.

The polyol different from said polyether polyol has a molecular weight of preferably more than 300 g/mol, more preferably not less than 500 g/mol, and most preferably 500 to 8000 g/mol.

The polyol different from said polyether polyol preferably contains 2 to 6 hydroxyl functional groups, most preferably 2 to 3 hydroxyl functional groups.

Isocyanate Oligomer (b2)

The isocyanate oligomer is preferably obtained by the oligomerization of a system comprising one or more of the following components: 1,4-diisocyanatobutane, 1,5-diisocyanatopentane, 1,6-diisocyanatohexane (HDI), 1,5-diisocyanato-2,2-dimethylpentane, 2,2,4- or 2,4,4-trimethyl-1,6-diisocyanatohexane, 1-isocyano-3,3,5-trimethyl-5-isocyanomethylcyclohexane (IPDI), 1-isocyano-1-methyl-4-(3)-isocyanomethylcyclohexane, bis(4)-isocyanocyclohexylmethane, 2,4- or 4,4-diisocyanatocyclohexylmethane, 1,10-diisocyanatodecane, 1,12-diisocyanatododecane, 1,3- or 1,4-cyclohexane diisocyanate, m-xylylene diisocyanate and isomers thereof, 4-isocyanomethyl-1,8-octane diisocyanate (TIN), 2,4-diisocyanotoluene or 2,6-diisocyanotoluene, 2,2'- or 2,4'- or 4'4'-diphenylmethane diisocyanate and pentamethylene diisocyanate.

The oligomerization may be carbodiimidation, dimerization, trimerization, biuretization, urealation, urethanization, allophanation or cyclization to form a oxadiazine group. These reactions usually occur simultaneously or continuously.

The isocyanate oligomer preferably comprises one or more of the following groups: iminooxadiazinedione, isocyanurate, uretdione, carbamate, allophanate, biuret, urea, oxadiazinetrione, oxazolidinone, acyl urea and carbodiimide groups; most preferably one or more of the following groups: allophanate, biuret, uretdione, isocyanurate, and iminooxadiazinedione groups.

The isocyanate oligomer is preferably one or more of the following: derivatives of an aliphatic polyisocyanate, an alicyclic polyisocyanate, an araliphatic polyisocyanate and an aromatic polyisocyanate having iminooxadiazinedione, isocyanurate, uretdione, carbamate, allophanate, biuret, urea, oxadiazinetrione, oxazolidinone, acyl urea and/or carbodiimide groups.

The isocyanate oligomer is more preferably one or more of the following: derivatives of an aliphatic polyisocyanate and an alicyclic polyisocyanate having iminooxadiazinedione, isocyanurate, uretdione, carbamate, allophanate, biuret, urea, oxadiazinetrione, oxazolidinone, acyl urea and/or carbodiimide groups.

The isocyanate oligomer is further preferably one or more of the following: derivatives of an aliphatic triisocyanate, an alicyclic triisocyanate, an araliphatic triisocyanate and an aromatic triisocyanate having iminooxadiazinedione, isocyanurate, uretdione, carbamate, allophanate, biuret, urea, oxadiazinetrione, oxazolidinone, acyl urea and/or carbodiimide groups; more preferably derivatives of an aliphatic triisocyanate, an alicyclic triisocyanate, an araliphatic triisocyanate and an aromatic triisocyanate having allophanate, biuret, uretdione, isocyanurate and/or iminooxadiazinedione groups; further preferably derivatives of an aliphatic triisocyanate and an alicyclic triisocyanate having allophanate, biuret, uretdione, isocyanurate and/or iminooxadiazinedione groups; and most preferably one or more of the following: Desmodur N 3300, Desmodur N 3600 and Desmodur N 3900.

The isocyanate oligomer has an isocyanate group content of preferably 10 to 50 wt %, and most preferably 20 to 25 wt %, based on the total weight of the isocyanate oligomer.

The isocyanate oligomer preferably has an isocyanate group functionality of 2 to 4.

The isocyanate oligomer preferably has a viscosity of 700 to 3000 mPa·s (23° C.).

The isocyanate oligomer has an isocyanate group equivalent of preferably 170 to 200.

The weight ratio of the isocyanate prepolymer to the isocyanate oligomer is preferably from 1:2 to 2:1, more preferably from 1:1.5 to 1.5:1, and most preferably from 1:1.5 to 1:1.

Isocyanate Prepolymer (b3) Different from the Isocyanate Prepolymer (b1)

The isocyanate component may further comprise an isocyanate prepolymer b3 different from the isocyanate prepolymer b1.

The isocyanate prepolymer b3 has a content of preferably less than 70 wt %, most preferably not more than 50 wt %, based on the total weight of the isocyanate prepolymer b1 and the isocyanate prepolymer b3.

The weight ratio of the total weight of the isocyanate prepolymer b1 and the isocyanate prepolymer b3 to that of the isocyanate oligomer is preferably more than 1:4 and less than 4:1, more preferably from 1:2 to 2:1, further preferably from 1:1.5 to 1.5:1, and most preferably from 1:1.5 to 1:1.

The sum of the amounts of the isocyanate-reactive component (a) and the isocyanate component (b) is preferably from 93 to 100 wt %, based on the total weight of the composition.

Catalyst (c)

The catalyst may be a catalyst capable of accelerating the reaction of isocyanate groups with moisture such as water.

The catalyst is preferably one or more of the following: a tertiary amine and a metal salt, most preferably a tertiary amine.

The tertiary amine catalyst is preferably one or more of the following: triethylamine, dimorpholinyl diethyl ether, N,N-dimethylaminocyclohexane, tris-(dimethylaminomethyl)phenol, 1,3,5-tris(dimethylaminopropyl)-hexahydrotriazine, bis(dimethylaminoethyl)ether and 2-[[2-[2-(dimethylamino)ethoxyethyl]methylamino]-ethanol.

The metal salt is preferably one or more of the following: ferric chloride, zinc chloride, bismuth isooctanoate and bismuth carboxylate.

The catalyst has a content of preferably 0.001 to 5 wt %, further preferably 0.01 to 3 wt %, particularly preferably 0.1 to 1.5 wt %, and most preferably 0.15 to 0.35 wt %, based on the total weight of the isocyanate component.

Additive (d)

The additive is preferably one or more of the following: a wetting agent, a dispersant, a matting agent, an antifoaming agent, a film former, a thickener, an elastomer, a pigment filler, a leveling agent, and other additives well-known to those skilled in the art that can be added to the coating composition.

The amount of the additive may be an amount well-known to those skilled in the art that can be added.

Use

The coating composition is preferably used to protect the surface of a floor, a wall, reinforced concrete or a metal container, or other surfaces that require protection.

The substrate may be artificial stone, wood, artificial wood, marble, terrazzo, ceramic, linoleum, metal, mineral material, plastic, rubber, concrete, composite sheet, paper, leather or glass.

The substrate may be subject to pretreatment, preferably polishing or coating.

Coating Method

The curing and drying temperature is preferably 23±2° C., and the humidity is preferably 50±5%.

The application may be a method well-known to those skilled in the art, such as knife coating, dip coating, brush coating, roller coating, spray coating or shower coating.

Coated Product

The coated product is preferably a floor, a wall, a wind blade or a metal object.

The coating has a thickness of preferably 60 to 250 μm.

The coating may be monolayer or multilayer.

EXAMPLES

All technical and scientific terms used herein have the same meaning as commonly understood by those skilled in the art to which the present invention belongs, unless otherwise defined. When the definition of a term in the present description conflicts with the meaning as commonly understood by those skilled in the art to which the present invention belongs, the definition described herein shall apply.

All numerical values expressing amount of ingredients, reaction conditions and the like which are used in the description and claims are to be understood as being modified by the term "about", unless otherwise specified. Accordingly, unless indicated to the contrary, the numerical values and parameters described herein are approximate values which can be varied according to the desired performance obtained as required.

The grammatical articles "one", "a", "an", and "the", as used in this specification, are intended to include "at least one" or "one or more", unless otherwise specified. By way of example, "a component" means one or more components, and thus, possibly, more than one component is contemplated and may be employed or used in an implementation of the described embodiments.

The term "and/or" used herein refers to one or all of the elements mentioned.

The terms "including" and "comprising" used herein cover both the case that there are only the elements mentioned and the case that there are also other elements unmentioned in addition to the elements mentioned.

All percentages in the present invention refer to weight percentage, unless otherwise specified.

The analysis and measurement in the present invention are carried out at a temperature of 23±2° C. and a humidity of 50±5%, unless otherwise specified.

The weight-average molecular weight is determined in tetrahydrofuran by using polystyrene as standards according to the Standard DIN 55672-1:2016-03.

The isocyanate group (NCO) content is determined according to DIN-EN ISO 11909, and the measured data includes free and potentially free NCO contents.

The isocyanate monomer content is determined according to DIN EN ISO 10283.

The viscosity is determined according to DIN EN ISO 3219, by using the MV-DIN rotor.

The amino group content is determined according to AFAM 2011-06054.

The hydroxyl group content is determined according to DIN EN ISO 4629-2.

Bubble-free film thickness (BFFT) is considered as greater than or equal to the thickness of the coating applied onto glass by using a film scraper capable of adjusting the film thickness (setting the film thicknesses of 100 μm, 200 μm and 400 μm) to produce coatings of different thicknesses (test method of a coating thickness: the cured coating is peeled off from the glass and measured by a film thickness meter) in an application area of ca. 15 cm*10 cm, and having no obvious bubbles (<10) on its surface after curing for one day.

Tack-free time is determined according to GB/T13477.5-2002, wherein the coating is prepared by using a film scraper (setting a film thickness of 200 μm) on glass. "Tack-free" means that when the surface of a coating is touched with a finger, it feels sticky, but no coating gets on the finger. Thus, "tack-free time" refers to the period of time from applying a composition onto a glass surface to the point at which the resulting coating is tack-free.

Pendulum hardness is the hardness of a coating measured using a BYK pendulum hardness tester, wherein the coating is prepared by using a film scraper (setting a film thickness of 200 μm) on glass. Pendulum hardness (1 d) refers to the pendulum hardness of a coating after storage for one day, and the pendulum hardness (7 d) refers to the pendulum hardness of a coating after storage for seven days.

Pot life is the period of time from the beginning of mixing the components of a coating composition to the time when the coating composition cannot be manually applied by a roller without any further substances added. A longer pot life indicates that the applicable time of the coating composition is longer.

Raw Materials and Reagents

Desmophen NH 1420: having an amino group equivalent of 279, and a viscosity of 1500 mPa·s (25° C.), available from Covestro (Germany) Co., Ltd.

Desmophen NH 2850: having an amino group equivalent of 295, and a viscosity of 100 mPa·s (25° C.), available from Covestro (Germany) Co., Ltd.

Desmodur N 3600: HDI-based aliphatic trimer, having a solid content of 100 wt %, an NCO equivalent of 183, an NCO content of 23.0 wt %, a HDI monomer content of less than 0.25 wt %, and a viscosity of about 1200 mPa·s (23° C.), available from Covestro Co., Ltd.

Desmodur N 3900: HDI-based aliphatic trimer, having a solid content of 100 wt %, an NCO equivalent of 179, an NCO content of 23.5 wt %, a HDI monomer content of less than 0.25 wt %, a viscosity of about 730 mPa·s (23° C.), and an NCO functionality of 3, available from Covestro Co., Ltd.

Desmodur N 3300: HDI-based aliphatic trimer, having a solid content of 100 wt %, an NCO equivalent of 194, an NCO content of 21.7 wt %, a HDI monomer content of less than 0.25 wt %, a viscosity of about 3000 mPa·s (23° C.), and an NCO functionality of 3, available from Covestro Co., Ltd.

Desmodur E 2863 XP: reaction product of an aliphatic polyester polyol and HDI, having a solid content of 100 wt %, an NCO equivalent of 378, an NCO content of 11.1 wt %, a HDI monomer content of less than 0.3 wt %, and a viscosity of about 1350 mPa·s (23° C.), available from Covestro Co., Ltd.

Desmodur XP 2617: reaction product of an aliphatic polyether polyol and HDI, having a solid content of 100 wt %, an NCO equivalent of 336, an NCO content of 12.5 wt %, a HDI monomer content of less than 0.5 wt %, and a viscosity of about 4250 mPa·s (23° C.), the aliphatic polyether polyol having a weight-average molecular weight of less than 400, available from Covestro Co., Ltd.

Polyether L 800: polyoxypropylene diol comprising the structure of formula III and the structure of formula IV, having a hydroxyl number of 515 mg/g KOH, a functionality of 2, and a weight-average molecular weight Mw of 220, the amount of —$R^1_n$— structure being 90% or more based on the weight of the polyether polyol, available from Covestro Co., Ltd.

Polyether LP 112: polyoxypropylene diol comprising the structure of formula III and the structure of formula IV, having a hydroxyl number of 112 mg/g KOH, a functionality of 2, and a weight-average molecular weight Mw of 1000, the amount of —$R^1_n$— structure being 90% or more based on the weight of the polyether polyol, available from Covestro Co., Ltd.

Acclaim 4200: polyoxypropylene diol comprising the structure of formula III and the structure of formula IV, having a hydroxyl number of 28 mg/g KOH, a functionality of 2, and a weight-average molecular weight Mw of 4000, the amount of —$R^1{}_n$— structure being 90% or more based on the weight of the polyether polyol, available from Covestro Co., Ltd.

Polyether L 5050: copolymer of polyoxypropylene diol and polyoxyethylene diol comprising the structure of formula III and the structure of formula IV, having the structure of formula X, a hydroxyl number of 57 mg/g KOH, a weight ratio of polyoxypropylene diol to polyoxyethylene diol equal to 1:1, a functionality of 2, and a weight-average molecular weight Mw of 1968, the amount of —$R^1{}_n$— structure being about 50% based on the weight of the polyether polyol, available from Covestro Co., Ltd.

PO$_3$G H 2400: poly-1,3-propanediol comprising the structure of formula II, having a hydroxyl number of 47.5 mg/g KOH, a functionality of 2, a weight-average molecular weight Mw of 2362, the amount of —$R^1{}_n$— structure being 90% or more based on the weight of the polyether polyol, available from ALLESSA.

Desmophen 3600 Z: polyoxypropylene diol comprising the structure of formula III and the structure of formula IV, having a hydroxyl number of 56 mg/g KOH, a functionality of 2, a weight-average molecular weight Mw of 2000, the amount of —$R^1{}_n$— structure being 90% or more based on the weight of the polyether polyol, available from Covestro Co., Ltd.

Desmodur® H: 1,6-hexamethylene diisocyanate, having an isocyanate functionality of 2, available from Covestro Co., Ltd.

Isophthaloyl chloride: a terminator, available from Sigma-Aldrich (Shanghai) Trading Co., Ltd.

DABCO NE310: a tertiary amine catalyst with a viscosity of 12 mPa·s (25° C.), available from Air Products.

DABCO BL-19: a tertiary amine catalyst with a viscosity of 4 mPa·s (25° C.), available from Air Products.

Zirconium 18 HS: a zirconium-based metal catalyst, available from OMG Borchers GmbH.

BYK 085: silicone surface additive for solvent-free coatings, available from BYK Additives.

Irganox E 201: an antioxidant, available from BASF.

Borchi® Kat 22: a catalyst, available from OMG Borchers GmbH.

BYK 333: silicone surface additive for solvent-free, solvent-borne and waterborne coatings and printing inks, available from BYK Additives.

BYK 331: silicone surface additive for solvent-free, solvent-borne and waterborne coatings and printing inks, available from BYK Additives.

Molecular sieve: 4 Å molecular sieve, available from Grace Trading (Shanghai) Co., Ltd.

PGDA: low-odor solvent, available from Dow Chemical.

DMM: low-odor solvent, available from Dow Chemical.

Method for Preparing the Isocyanate Prepolymer

Isocyanate Prepolymer 1

In a 1 L reaction vessel, 0.11 g of Irganox E 201 was added to 450 g of Desmodur® H under nitrogen atmosphere and stirring. The mixture was heated to 100° C., and 69.46 g of Polyether L 800 was added dropwise through a dropping funnel. When the NCO value of the mixture in the vessel reached 43.54%, the temperature was lowered to 95° C. 0.7 mL of Borchi® Kat 22 solution (Borchi® Kat 22 dissolved in 2-ethylhexanol in a concentration of 5 wt %) was then added dropwise. When the NCO value of the mixture in the vessel reached 39.81%, 0.28 g of isophthaloyl chloride was added to terminate the reaction and the heating was stopped. The excess Desmodur® H monomers were removed by distillation and a thin film evaporation apparatus to obtain the comparative isocyanate prepolymer 1.

Isocyanate Prepolymer 2

In a 1 L reaction vessel, 0.11 g of Irganox E 201 was added to 600 g of Desmodur® H under nitrogen atmosphere and stirring. The mixture was heated to 100° C., and 237 g of Polyether LP 112 was added dropwise through a dropping funnel. When the NCO value of the mixture in the vessel reached 33.51%, the temperature was lowered to 95° C. 0.3 mL of Borchi® Kat 22 solution (Borchi® Kat 22 dissolved in Polyether LP 112 in a concentration of 10 wt %) was then added dropwise. When the NCO value of the mixture in the vessel reached 31.34%, 0.23 g of isophthaloyl chloride was added to terminate the reaction and the heating was stopped. The excess Desmodur® H monomers were removed by distillation and a thin film evaporation apparatus to obtain the isocyanate prepolymer 2.

Isocyanate Prepolymer 3

In a 1 L reaction vessel, 0.12 g of Irganox E 201 was added to 550 g of Desmodur® H under nitrogen atmosphere and stirring. The mixture was heated to 100° C., and 300 g of Acclaim 4200 was added dropwise through a dropping funnel. When the NCO value of the mixture in the vessel reached 31.78%, the temperature was lowered to 95° C. 0.9 mL of Borchi® Kat 22 solution (Borchi® Kat 22 dissolved in 2-ethylhexanol in a concentration of 5 wt %) was then added dropwise. When the NCO value of the mixture in the vessel reached 39.81%, 0.33 g of isophthaloyl chloride was added to terminate the reaction and the heating was stopped. The excess Desmodur® H monomers were removed by distillation and a thin film evaporation apparatus to obtain the isocyanate prepolymer 3.

Isocyanate Prepolymer 4

In a 1 L reaction vessel, 0.12 g of Irganox E 201 was added to 430 g of Desmodur® H under nitrogen atmosphere and stirring. The mixture was heated to 100° C., and 355 g of Polyether L 5050 was added dropwise through a dropping funnel. When the NCO value of the mixture in the vessel reached 25.69%, the temperature was lowered to 95° C. 1.874 mL of Borchi® Kat 22 solution (Borchi® Kat 22 dissolved in 2-ethylhexanol in a concentration of 5 wt %) was then added dropwise. When the NCO value of the mixture in the vessel reached 24.05%, 0.72 g of isophthaloyl chloride was added to terminate the reaction and the heating was stopped. The excess Desmodur® H monomers were removed by distillation and a thin film evaporation apparatus to obtain the isocyanate prepolymer 4.

Isocyanate Prepolymer 5

In a 1 L reaction vessel, 0.11 g of Irganox E 201 was added to 375 g of Desmodur® H under nitrogen atmosphere and stirring. The mixture was heated to 100° C., and 350 g of PO$_3$G H 2400 was added dropwise through a dropping funnel. When the NCO value of the mixture in the vessel reached 24.05%, the temperature was lowered to 95° C. 0.5 mL of Borchi® Kat 22 solution (Borchi® Kat 22 dissolved in 2-ethylhexanol in a concentration of 5 wt %) was then added dropwise. When the NCO value of the mixture in the vessel reached 22.46%, 0.18 g of isophthaloyl chloride was added to terminate the reaction and the heating was stopped. The excess Desmodur® H monomers were removed by distillation and a thin film evaporation apparatus to obtain the isocyanate prepolymer 5.

Isocyanate Prepolymer 6

In a 1 L reaction vessel, 0.11 g of Irganox E 201 was added to 450 g of Desmodur® H under nitrogen atmosphere and stirring. The mixture was heated to 100° C., and 350 g of Desmophen 3600 Z was added dropwise through a dropping funnel. When the NCO value of the mixture in the vessel reached 26.07%, the heating was stopped. The excess Desmodur® H monomers were removed by distillation and a thin film evaporation apparatus to obtain the isocyanate prepolymer 6.

Isocyanate Prepolymer 7

In a 1 L reaction vessel, 450 g of Desmodur® H was added under nitrogen atmosphere and stirring, and heated to 100° C. 356.8 g of Desmophen 3600 Z was added dropwise through a dropping funnel. When the NCO value of the mixture in the vessel reached 25.75%, the temperature was lowered to 95° C. 0.3 mL of Borchi® Kat 22 solution (Borchi® Kat 22 dissolved in Desmophen 3600 Z in a concentration of 10 wt %) was then added dropwise. When the NCO value of the mixture in the vessel reached 24.12%, 0.0244 g of isophthaloyl chloride was added to terminate the reaction and the heating was stopped. The excess Desmodur® H monomers were removed by distillation and a thin film evaporation apparatus to obtain the isocyanate prepolymer 7.

The isocyanate equivalent, isocyanate content, solid content and viscosity of the isocyanate prepolymers 1-7 are listed in Table 1. Table 1 shows the physical property parameters of the isocyanate prepolymers 1-7.

TABLE 1 the physical property parameters of the isocyanate prepolymers 1-7

| Isocyanate prepolymer | NCO equivalent | NCO content/ wt % | Solid content/ wt % | Viscosity/ mPa · s |
|---|---|---|---|---|
| 1 | 248 | 17.0 | 100 | 2363 |
| 2 | 464 | 9.1 | 100 | 1647 |
| 3 | 1053 | 4.0 | 100 | 2597 |
| 4 | 691 | 6.1 | 100 | 1736 |
| 5 | 852 | 4.9 | 100 | 8231 |
| 6 | 1135 | 3.7 | 100 | 1374 |
| 7 | 700 | 6.0 | 100 | 2500 |

Reference Values for the Bubble-Free Film Thickness, Pot Life, Tack-Free Time, and Coating Performance Index of a Coating Composition Table 2 shows the reference values for the bubble-free film thickness, pot life, tack-free time, and coating performance index of a coating composition.

TABLE 2 reference values for the bubble-free film thickness, pot life, tack-free time, and coating performance index of a coating composition

| Index | Reference values |
|---|---|
| Bubble-free film thickness (BFFT) | ≥200 μm |
| Pot life | ≥30 min |
| Tack-free time | ≤2.5 h |
| Pendulum hardness (1d) | >10 s |
| Pendulum hardness (7d) | >70 s |

Ideally, a coating composition has a bubble-free film thickness and a pot life greater than or equal to the relevant reference values, and a tack-free time less than or equal to the relevant reference value, and the coating formed by the coating composition has a pendulum hardness (1 d, 7 d) greater than the relevant reference value.

Method for Preparing a Coating Composition

The amounts of the components are shown in Tables 3-7. The isocyanate-reactive component, BYK085, molecular sieve, optional NE310, optional BYK333, optional BYK331, optional DMM and optional PGDA were mixed and stirred at normal temperature for 10 to 30 minutes to obtain a mixture A. The isocyanate oligomer and the isocyanate prepolymer were mixed and stirred at normal temperature for 5 to 10 minutes to obtain a mixture B. The mixture A and the mixture B were mixed and stirred at normal temperature for 3 to 5 minutes to obtain a coating composition.

Method for Preparing a Coating

The coating composition was applied to the surface of a glass using a film scraper capable of adjusting the film thickness in an application area of 15 cm*10 cm. A coating was obtained after curing and drying at 23° C. and 50% RH.

Examples 1-7 and Comparative Examples 1-5

Table 3 shows the components of the compositions in Examples 1-7 and Comparative Examples 1-5, as well as the test results of these compositions and their coatings.

TABLE 3

Components and test results of the compositions in Examples 1-7 (Ex 1-7) and Comparative Examples 1-5 (CE 1-5)

| Components/g | CX 1 | CX 2 | CX 3 | CX 4 | CX 5 | Ex 1 | Ex 2 | Ex 3 | Ex 4 | Ex 5 | Ex 6 | Ex 7 |
|---|---|---|---|---|---|---|---|---|---|---|---|---|
| NH 1420 | 30 | 30 | 30 | 30 | 30 | 30 | 30 | 30 | 30 | 30 | 30 | 30 |
| BYK 085 | 0.15 | 0.15 | 0.15 | 0.15 | 0.15 | 0.15 | 0.15 | 0.15 | 0.15 | 0.15 | 0.15 | 0.15 |
| BYK 333 | 0.10 | 0.10 | 0.10 | 0.10 | 0.10 | 0.10 | 0.10 | 0.10 | 0.10 | 0.10 | 0.10 | 0.10 |
| NE 310 | 0.09 | 0.06 | 0.06 | 0.03 | 0.03 | 0.12 | 0.06 | 0.06 | 0.12 | 0.11 | 0.11 | 0.11 |
| Molecular sieve | 1.000 | 1.00 | 1.00 | 1.00 | 1.00 | 1.00 | 1.00 | 1.00 | 1.00 | 1.00 | 1.00 | 1.00 |
| DMM | 3.40 | 3.60 | 3.60 | 3.60 | 3.60 | 4 | 3.80 | 4 | 4 | 3.80 | 3.90 | |
| Desmodur N 3600 | 26.40 | 30.00 | 29.00 | 30.00 | 29.00 | 35.30 | 33.50 | 34.40 | 35.60 | 33.50 | 33.50 | 33.60 |
| Isocyanate prepolymer 1 | 17.80 | | | | | | | | | | | |
| Isocyanate prepolymer 2 | | | | | | 23.60 | | | | | | |
| Isocyanate prepolymer 3 | | | | | | | 22.50 | | | | | |
| Isocyanate prepolymer 4 | | | | | | | | 22.80 | | | | |
| Isocyanate prepolymer 5 | | | | | | | | | 23.80 | | | |
| Isocyanate prepolymer 6 | | | | | | | | | | | 22.50 | |
| Isocyanate prepolymer 7 | | | | | | | | | | | 22.40 | 22.50 |
| Desmodur E 2863 XP | | 20.30 | | 20.10 | | | | | | | | |
| Desmodur XP 2617 | | | 19.50 | | 19.20 | | | | | | | |
| NCO/NH (mol %) | 2.0 | 2.0 | 2.0 | 2.0 | 2.0 | 2.0 | 2.0 | 2.0 | 2.0 | 2.0 | 2.0 | 2.0 |

TABLE 3-continued

Components and test results of the compositions in Examples 1-7 (Ex 1-7) and Comparative Examples 1-5 (CE 1-5)

| Components/g | CX 1 | CX 2 | CX 3 | CX 4 | CX 5 | Ex 1 | Ex 2 | Ex 3 | Ex 4 | Ex 5 | Ex 6 | Ex 7 |
|---|---|---|---|---|---|---|---|---|---|---|---|---|
| VOC (g/L) | 49.14 | 48.21 | 49.24 | 48.34 | 49.44 | 48.42 | 47.60 | 49.34 | 48.17 | 47.57 | 48.81 | 0 |
| Pot life/min | 25 | >30 | >30 | >30 | >30 | >30 | >30 | >30 | >30 | >30 | >30 | >30 |
| Tack-free time/min | 30 | 50 | 45 | 50 | 50 | 35 | 50 | 40 | 50 | 45 | 40 | 35 |
| Pendulum hardness (1 d)/s | 111 | 54 | 68 | 10 | 13 | 69 | 22 | 31 | 48 | 13 | 70 | 82 |
| Pendulum hardness (7 d)/s | 153 | 113 | 91 | 90 | 129 | 135 | 101 | 104 | 135 | 136 | 146 | 136 |
| Bubble-free film thickness/μm | <100 | <100 | <100 | >100, <200 | >100, <200 | ≥200 | ≥200 | ≥200 | ≥200 | ≥200 | ≥200 | ≥200 |

The coating compositions of Examples 1-7 have a long pot life, and the coatings formed by these coating compositions have a short tack-free time, a good bubble-free film thickness and a good pendulum hardness.

It can be seen from Comparative Examples 1, 3 and 5 that when the polyether polyol as one of the reaction components of the isocyanate prepolymer in the coating composition has a weight-average molecular weight of less than 400, the coating formed by the coating composition comprising the resultant isocyanate prepolymer has a short tack-free time and a good pendulum hardness, but a bubble-free film thickness lower than the relevant reference value, and the corresponding coating composition has a pot life also lower than the relevant reference value.

As is apparent from Comparative Examples 2 and 4, when the polyester polyol as one of the reaction components of the isocyanate prepolymer in the coating composition is used, the coating composition comprising the resultant isocyanate prepolymer has a long pot life, and the coating formed therefrom has a short tack-free time and a good pendulum hardness, but a bubble-free film thickness lower than the relevant reference value.

Examples 6, 8-9 and Comparative Examples 6-8

Table 4 shows the components of the compositions in Examples 6, 8-9 and Comparative Examples 6-8, as well as the test results of these compositions and their coatings.

The coating compositions of Examples 6 and 8-9 have a long pot life, and the coatings formed by these coating compositions have a short tack-free time, a good bubble-free film thickness, and a good pendulum hardness.

It can be seen from Comparative Examples 6-8 that when the coating composition does not comprise the isocyanate prepolymer or the weight ratio of the isocyanate prepolymer to the isocyanate oligomer in the composition is 1:4 or 4:1, the coating formed by the coating composition comprising the resultant isocyanate prepolymer cannot have both a good bubble-free film thickness and a pendulum hardness.

Examples 10-18

Table 5 shows the components of the compositions in Examples 10-18, as well as the test results of these compositions and their coatings.

TABLE 4

Components and test results of the compositions in Examples 6, 8-9 (Ex6, 8-9) and Comparative Examples 6-8 (CE 6-8)

| Components/g | CX 6 | CX 7 | CX 8 | Ex 6 | Ex 8 | Ex 9 |
|---|---|---|---|---|---|---|
| NH 1420 | 30 | 30 | 30 | 30 | 30 | 30 |
| BYK 085 | 0.15 | 0.15 | 0.15 | 0.15 | 0.15 | 0.15 |
| BYK 333 | 0.10 | 0.10 | 0.10 | 0.10 | 0.10 | 0.10 |
| NE 310 | 0.08 | 0.09 | 0.19 | 0.11 | 0.13 | 0.14 |
| Molecular sieve | 1.00 | 1.00 | 1.00 | 1.00 | 1.00 | 1.00 |
| DMM | 3.20 | 3.50 | 5.50 | 3.90 | 4.20 | 4.40 |
| Desmodur N 3600 | 39.50 | 37 | 19.30 | 33.50 | 31.20 | 28.30 |
| Isocyanate prepolymer 7 |  | 9.30 | 76.90 | 22.40 | 31.20 | 42.50 |
| NCO/NH(mol %) | 2.0 | 2.0 | 2.0 | 2.0 | 2.0 | 2.0 |
| VOC(g/L) | 49.31 | 49.21 | 47.16 | 48.81 | 48.92 | 47.12 |
| Pot life/min | >30 | 25 | >30 | >30 | >30 | >30 |
| Tack-free time/min | 30 | 30 | 120 | 40 | 40 | 75 |
| Pendulum hardness(1 d)/s | 135 | 85 | 12 | 70 | 41 | 21 |
| Pendulum hardness (7 d)/s | 157 | 156 | 24 | 146 | 117 | 82 |
| Bubble-free film thickness/μm | >100, <200 | >100, <200 | ≥200 | ≥200 | ≥200 | ≥200 |

TABLE 5

Components and test results of the compositions in Examples 10-18 (Ex 10-18)

| Components/g | Ex 10 | Ex 11 | Ex 12 | Ex 13 | Ex 14 | Ex 15 | Ex 16 | Ex 17 | Ex 18 |
|---|---|---|---|---|---|---|---|---|---|
| NH 1420 | 45 | 45 | 45 | 45 | 45 | 45 | 45 | 45 | 45 |
| BYK 085 | 0.20 | 0.20 | 0.20 | 0.20 | 0.20 | 0.20 | 0.20 | 0.20 | 0.20 |
| BYK 331 | 0.10 | 0.10 | 0.10 | 0.10 | 0.10 | 0.10 | 0.10 | 0.10 | 0.10 |
| NE 310 | 0.06 | 0.16 | 0.06 | 0.17 | 0.21 | 0.31 | 0.41 | 0.17 | 0.49 |
| Molecular sieve | 1 | 1 | 1 | 1 | 1 | 1 | 1 | 1 | 1 |
| DMM | 4.50 | 4.50 | 4.50 | 5.5 | 7 | 8 | 9 | 6 | 10 |
| Desmodur N 3600 | | 32 | 38 | 50 | 63 | 75 | 88 | 52 | 100 |
| Desmodur N 3900 | 40 | | | | | | | | |
| Isocyanate prepolymer 7 | 17.14 | 48 | 25.33 | 33.33 | 42.00 | 50 | 58.67 | | 66.67 |
| Isocyanate prepolymer 2 | | | | | | | | 34.67 | |
| NCO/NH(mol %) | 1.5 | 1.5 | 1.5 | 2.0 | 2.5 | 3.0 | 3.5 | 2.2 | 4.0 |
| VOC(g/L) | 46.81 | 38.35 | 44.18 | 45.58 | 49.51 | 49.94 | 49.87 | 48.34 | 50.19 |
| Pot life/min | >30 | >30 | >30 | >30 | >30 | >30 | >30 | >30 | >30 |
| Tack-free time/min | 35 | 35 | 35 | 40 | 100 | 110 | 120 | 50 | 150 |
| Pendulum hardness (1 d)/s | 54 | 42 | 74 | 73 | 69 | 71 | 73 | 43 | 89 |
| Pendulum hardness (7 d)/s | 114 | 86 | 141 | 151 | 128 | 100 | 117 | 117 | 114 |
| Bubble-free film thickness/μm | ≥200 | ≥200 | ≥200 | ≥200 | ≥200 | ≥200 | ≥200 | ≥200 | ≥200 |

It can be seen from Examples 10-18 that when the molar ratio of NCO/NH in the coating composition is adjusted within a range of 1.5:1 to 4:1, the coating composition has a long pot life, and the coating formed by the coating composition has a short tack-free time, a good bubble-free film thickness and a good pendulum hardness. In particular, when the molar ratio of NCO/NH is from 1.5:1 to 3:1, the overall performance of the coating composition and the coating formed therefrom is superior, and the coating has a shorter tack-free time.

Examples 19-20

Table 6 shows the components of the compositions in Examples 19-20, as well as the test results of these compositions and their coatings.

TABLE 6

Components and test results of the compositions in Examples 19-20 (Ex 19-20)

| Components/g | Ex 19 | Ex 20 |
|---|---|---|
| NH 1420 | 30 | 45 |
| NH 2850 | 15 | |
| BYK 085 | 0.20 | 0.20 |
| BYK 331 | 0.10 | 0.10 |
| NE 310 | 0.23 | 0.19 |
| Molecular sieve | 1 | 1 |
| PGDA | 6.50 | 3.50 |
| DMM | | 3.50 |
| Desmodur N 3600 | 20 | 18 |
| Desmodur N 3300 | 28 | 28 |
| Isocyanate prepolymer 7 | 46 | 50 |
| NCO/NH (mol %) | 2.0 | 2.0 |
| VOC (g/L) | 49.43 | 52.29 |
| Pot life/min | >30 | >30 |
| Tack-free time/min | 70 | 50 |
| Pendulum hardness (1d)/s | 15 | 28 |
| Pendulum hardness (7d)/s | 81 | 100 |
| Bubble-free film thickness/μm | ≥200 | ≥200 |

It can be seen from Examples 19-20 that when the isocyanate-reactive component of the coating composition is a mixture of aspartic esters, the coating composition has a long pot life, and the coating formed by the coating composition has a short tack-free time, a good bubble-free film thickness, and a good pendulum hardness.

Examples 21-23 and Comparative Example 9

Table 7 shows the components of the compositions in Examples 21-23 and Comparative Example 9, as well as the test results of these compositions and their coatings.

TABLE 7

Components and test results of the compositions in Examples 21-23 (Ex 21-23) and Comparative Example 9 (CE 9).

| Components/g | CE 9 | Ex 21 | Ex 22 | Ex 23 |
|---|---|---|---|---|
| NH 1420 | 30 | 30 | 30 | 30 |
| BYK 085 | 0.15 | 0.15 | 0.15 | 0.15 |
| BYK 333 | 0.10 | 0.10 | 0.10 | 0.10 |
| NE 310 | 0.103 | 0.110 | | |
| Zirconium 18HS | | | 0.1 | |
| DABCO BL-19 | | | | 0.12 |
| Molecular sieve | 1 | 1 | 1 | 1 |
| DMM | 3.6 | 3.6 | 3.6 | 3.6 |
| Desmodur N 3600 | 30.9 | 33.0 | 28.5 | 33.5 |
| Desmodur E 2863 XP | 14.4 | | | |
| Isocyanate prepolymer 5 | | | 11 | |
| Isocyanate prepolymer 7 | 6.2 | 11 | 19.0 | 22.4 |
| NCO/NH (mol %) | 2.0 | 1.94 | 1.7 | 2.0 |
| VOC (g/L) | 47.56 | 45.68 | 49.88 | 4745.29 |
| Pot life/min | >30 | >30 | >30 | >30 |
| Tack-free time/min | 45 | 40 | 50 | 45 |
| Pendulum hardness (1d)/s | 23 | 48 | 17 | 73 |

TABLE 7-continued

Components and test results of the compositions in Examples 21-23 (Ex 21-23) and Comparative Example 9 (CE 9).

| Components/g | CE 9 | Ex 21 | Ex 22 | Ex 23 |
|---|---|---|---|---|
| Pendulum hardness (7d)/s | 127 | 131 | 72 | 142 |
| Bubble-free film thickness/μm | >100, <200 | ≥200 | ≥200 | ≥200 |

It can be seen from Comparative Example 9 that when the amount of the isocyanate prepolymer b1 of the isocyanate component is 30 wt % of the sum of the amounts of the isocyanate prepolymer b1 and the isocyanate prepolymer b3 different from the isocyanate prepolymer b1, the coating formed by the coating composition has a bubble-free film thickness lower than the relevant reference value.

It can be seen from Example 21 that when using a mixture of different isocyanate prepolymers b1, the coating composition has a long pot life, and the coating formed by the coating composition has a short tack-free time, a good bubble-free film thickness, and a good pendulum hardness.

It can be seen from Examples 22-23 that when changing the catalyst of the coating composition, the coating composition has a long pot life, and the coating formed by the coating composition has a short tack-free time, a good bubble-free film thickness, and a good pendulum hardness.

It is apparent to those skilled in the art that the present invention is not limited to the specific details described above, and may be embodied in other specific forms without departing from the spirit or essential characteristics of the present invention. The Examples are to be considered in all respects as illustrative but not restrictive, so that the scope of the present invention is defined by the claims rather than the foregoing description. Thus, any change, as long as it belongs to the meaning and range of equivalents of the claims, should be considered as part of this invention.

The invention claimed is:

1. A coating composition comprising:
   (a) an isocyanate-reactive component consisting of:
      (a1) at least one polyaspartic ester having an amino group equivalent of 200 to 500, and
      (a2) optionally a polyetheraspartic ester having an amino group equivalent of 200 to 2500;
   (b) an isocyanate component comprising:
      (b1) at least one isocyanate prepolymer, the at least one isocyanate prepolymer being a reaction product of components comprising at least one aliphatic isocyanate and at least one polyether polyol, the at least one polyether polyol having a weight-average molecular weight of 400 to 6000 and the structure of formula I:

HO—$R^1_n$—H    I, wherein $R^1$ has one or more of the following structures:

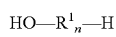    II

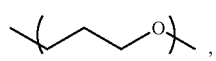    III

, and

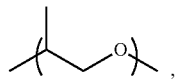    IV $n$ is an integer of 6 to 100,
      an amount of the —$R^1_n$— structure is at least 40 wt % based on a weight of the polyether polyol; and
      (b2) at least one isocyanate oligomer containing not less than two isocyanate groups,
      a weight ratio of the at least one isocyanate prepolymer (b1) to the at least one isocyanate oligomer (b2) being greater than 1:4 and less than 4:1;
   (c) a catalyst; and
   (d) optionally an additive;
   wherein a molar ratio of isocyanate groups to isocyanate-reactive groups in the coating composition is from 1.5:1 to 4:1, and
   wherein the coating composition has a pot life of greater than or equal to 30 minutes.

2. The composition according to claim 1, wherein the at least one polyether polyol has a weight-average molecular weight of 600 to 4000.

3. The composition according to claim 1, wherein the $R^1$ has one or more of the following structures: III and IV.

4. The composition according to claim 1, wherein the at least one polyether polyol is one or more of the following:
   (i) a polyether polyol having the structure of formula V:

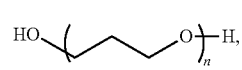    V (ii) a polyether polyol having the structure of formula VI:

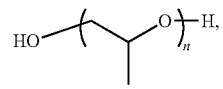    VI (iii) a polyether polyol having the structure of formula VII:

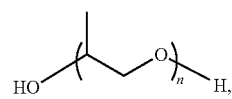    VII (iv) a polyether polyol having the structure of formula VIII:

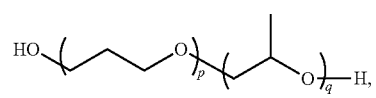    VIII (v) a polyether polyol having the structure of formula IX:

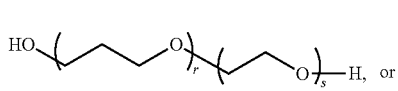

IX or (vi) a polyether polyol having the structure of formula X:

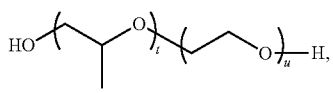

X wherein n is an integer of 6 to 100, and wherein p, q, r, s, t and u are each independently an integer of not less than 1, the sum of p and q is n, the sum of r and s is n, and the sum of t and u is n.

5. The composition according to claim 1, wherein the components for preparing the at least one isocyanate prepolymer further comprise at least one polyol different from the at least one polyether polyol, and the amount of the $-R^1_n-$ structure is at least 50 wt % based on a total weight of the at least one polyether polyol and the at lease one polyol different from said polyether polyol.

6. The composition according to claim 1, wherein the at least one polyaspartic ester (a1) comprises a polyaspartic ester according to formula XI:

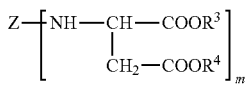

XI wherein
Z represents an aliphatic residue,
$R^3$ and $R^4$ are each independently an organic group that is inert to an isocyanate group at normal pressure and at 100° C. or less,
m is an integer of not less than 2.

7. The composition according to claim 1, wherein the at least one polyaspartic ester (a1) has a content of more than 50 wt %, based on a total weight of the isocyanate-reactive component (a).

8. The composition according to claim 1, wherein the at least one polyaspartic ester (a1) comprises one or more of the following:
(i) a polyaspartic ester having the structure of formula XII,

XII

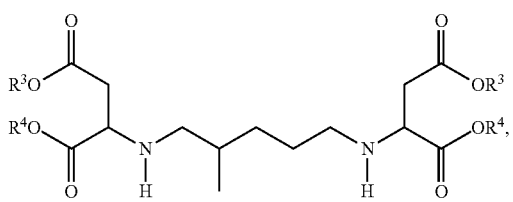

(ii) a polyaspartic ester having the structure of formula XIII, or

XIII

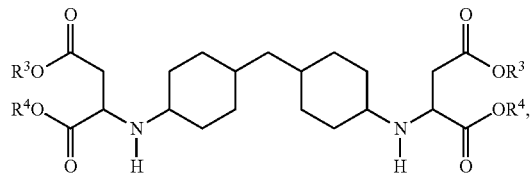

(iii) a polyaspartic ester having the structure of formula XIV,

XIV

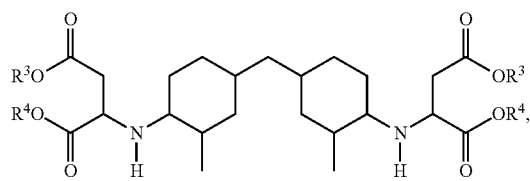

wherein $R^3$ and $R^4$ are each independently one or more of the following: methyl, ethyl, or butyl.

9. The composition according to claim 1, wherein the polyetheraspartic ester (a2) comprises a polyetheraspartic ester according to formula XV:

XV

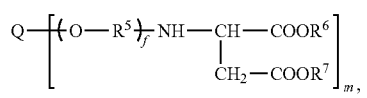

wherein
Q represents an aliphatic residue,
$R^6$ and $R^7$ are each independently an organic group that is inert to an isocyanate group at normal pressure and at 100° C. or less,
$R^5$ represents a $C_1$-$C_6$ alkyl residue,
m is an integer of not less than 2,
f is an integer of 1 to 35.

10. The composition according to claim 1, wherein the polyetheraspartic ester (a2) comprises a polyetheraspartic ester according to formula XVI:

XVI

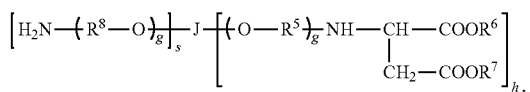

wherein
h is an integer of 2 to 4,
g is an integer of 1 to 35,
s is an integer of 1 to 2,
J is an alkyl residue,
$R^6$ and $R^7$ are each independently an organic group that is inert to an isocyanate group at normal pressure and at 100° C. or less,
$R^8$ is a $C_1$-$C_6$ alkyl residue.

11. The composition according to claim 1, wherein the at least one isocyanate oligomer (b2) comprises one or more of the following groups: an allophanate group, a biuret group, an uretdione group, an isocyanurate group, or an iminooxadiazinedione group.

12. The composition according to claim 1, wherein the at least one isocyanate oligomer (b2) is one or more of the following: a derivative of an aliphatic triisocyanate or a derivative of an alicyclic triisocyanate independently having allophanate, biuret, uretdione, isocyanurate, or iminooxadiazinedione groups, or a combination thereof.

13. The composition according to claim 1, wherein the at least one isocyanate oligomer (b2) has an isocyanate group content of 10 to 50 wt %, based on a total weight of the isocyanate oligomer.

14. The composition according to claim 1, wherein a weight ratio of the at least one isocyanate oligomer to the isocyanate oligomer (b2) is from 1:2 to 2:1.

15. A method of protecting a substrate surface or a coating thereof, comprising: applying the coating composition according to claim 1 to a substrate surface, followed by curing and drying.

16. A coating method comprising: applying the coating composition according to claim 1 to a substrate surface, followed by curing and drying.

17. A coated product comprising a substrate and a coating formed by applying the coating composition according to claim 1 to the substrate and then curing and drying.

18. The coated product according to claim 17, wherein the coated product is a floor, a wall, a wind blade, or a metal object.

\* \* \* \* \*